United States Patent
Simonen et al.

(10) Patent No.: US 11,558,881 B2
(45) Date of Patent: Jan. 17, 2023

(54) SCHEDULER INFORMATION-BASED DATA ACQUISITION AND INTERFERENCE DETECTION

(71) Applicant: NOKIA SOLUTIONS AND NETWORKS OY, Espoo (FI)

(72) Inventors: Mikko Simonen, Tampere (FI); Toni Aleksi Levanen, Tampere (FI); Lasse Harju, Tampere (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/749,663

(22) Filed: May 20, 2022

(65) Prior Publication Data
US 2022/0377759 A1     Nov. 24, 2022

(30) Foreign Application Priority Data
May 21, 2021 (FI) .................................... 20215606

(51) Int. Cl.
*H04W 72/12* (2009.01)
*H04L 5/00* (2006.01)

(52) U.S. Cl.
CPC ....... *H04W 72/1231* (2013.01); *H04L 5/0023* (2013.01); *H04W 72/1278* (2013.01)

(58) Field of Classification Search
None
See application file for complete search history.

(56) References Cited

U.S. PATENT DOCUMENTS

2005/0157826 A1 * 7/2005 Vaananen ............ H04B 1/28
                                                                      375/350
2010/0291876 A1 * 11/2010 Hariharan .......... H04W 72/082
                                                                      455/63.1
(Continued)

FOREIGN PATENT DOCUMENTS

DE       4497810      * 10/2009
WO    WO2021028006    * 2/2021

OTHER PUBLICATIONS

Office Action dated Jan. 19, 2022 corresponding to Finnish Patent Application No. 20215606.
(Continued)

*Primary Examiner* — Mohammad S Adhami
(74) *Attorney, Agent, or Firm* — Squire Patton Boggs (US) LLP (57) ABSTRACT

According to an aspect, there is provided an apparatus for a radio receiver or transceiver of a first access node. The apparatus is configured to perform the following. Upon receiving data via at least one antenna, the apparatus performs resource mapping on the received data based on scheduling information defining currently allocated uplink time-frequency resources to isolate at least a first data set corresponding to non-allocated uplink time-frequency resources. The apparatus compares the first data set against one or more first pre-defined criteria for detecting interference. In response to detecting interference in the first data set according to said one or more first pre-defined criteria, the apparatus instructs a scheduler entity of the first access node to avoid scheduling uplink time-frequency resources affected by said interference.

20 Claims, 4 Drawing Sheets

(56) References Cited

U.S. PATENT DOCUMENTS

2014/0335879 A1* 11/2014 Immendorf ......... H04W 72/082
                                                      455/452.1
2015/0056931 A1*  2/2015 Yerramalli ........... H04B 17/318
                                                      455/67.13
2016/0050676 A1   2/2016 Sinnaduray

OTHER PUBLICATIONS

Finnish Search Report dated Jan. 19, 2022 corresponding to Finnish Patent Application No. 20215606.
Communication of Acceptance—section 29 a of Patents Decree dated May 16, 2022 corresponding to Finnish Patent Application No. 20215606.
Extended European Search Report dated Oct. 7, 2022 corresponding to European Patent Application No, 22174462.6
Hossein Pirayesh et al., "Jamming Attacks and Anti-Jamming Strategies in Wireless Networks: A Comprehensive Survey," arxiv. org, Cornell University Library, Jan. 1, 2021, XP081851250.

* cited by examiner

SCHEDULER INFORMATION-BASED DATA ACQUISITION AND INTERFERENCE DETECTION

TECHNICAL FIELD

Various example embodiments relate to wireless communications.

BACKGROUND ART

A radio jammer is a device that deliberately blocks, jams, or otherwise interferes with a commercial wireless network operating in a licensed frequency band. Typically, jammer devices operate in wideband or narrowband spectrum. In wideband spectrum, the device transmits a wideband jamming radio signals that degrades the signal-to-noise ratio (SNR) of all channels in both uplink and downlink direction. In narrowband spectrum, the device blocks a specific signal that is essential for the operation of the wireless network, e.g., a synchronization signal in downlink or physical uplink control channel signal in uplink. Unintentional jamming can also occur, for example, when an operator transmits on a busy frequency band without first checking whether it is in use, or without being able to hear neighboring base transceiver stations using the same frequency band.

It is important that wireless networks such as a 5G NR networks are able to detect significant interference signals and provide information to the operator or network handler. Based on this information, the source of interference can be found and situation can be rectified. It is also important to avoid significant degradation in the system throughput by using available signal processing tools, e.g., beamforming solutions that null the received energy from the direction of the interference.

US2016050676 A1 discloses interference mitigation methods and systems. Therein a base station obtains physical channel inform base station obtains physical channel information of a transmission signaled in a first frequency band between the base station and at least one user equipment (UE) associated with the base station. The transmission corresponds to uplink or downlink communication. An interference mitigation controller compares the obtained physical channel information to a predetermined interference condition, to identify a presence of interference in the transmission. A second frequency band different from the first frequency band is selected, responsive to the identified presence of interference. The base station sends an instruction to the at least one UE associated with the base station to signal using the selected second frequency band.

US2014335879 A1 discloses that interference may be detected in a cellular network by receiving signals at a target base station in a quiet resource block in which no uplink transmissions to the target base station are scheduled to occur, identifying a plurality of user equipment attached to base stations neighboring a target base station as interfering user equipment, reconstructing signals transmitted by the interfering user equipment, removing the reconstructed signals from the signals received by the target base station in the quiet resource block, and determining interference in the signals from which the reconstructed signals are removed.

BRIEF DESCRIPTION

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide an apparatus, a method, and computer readable media for scheduler information-based data acquisition and interference detection.

BRIEF DESCRIPTION OF THE DRAWINGS

In the following, some example embodiments will be described with reference to the accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
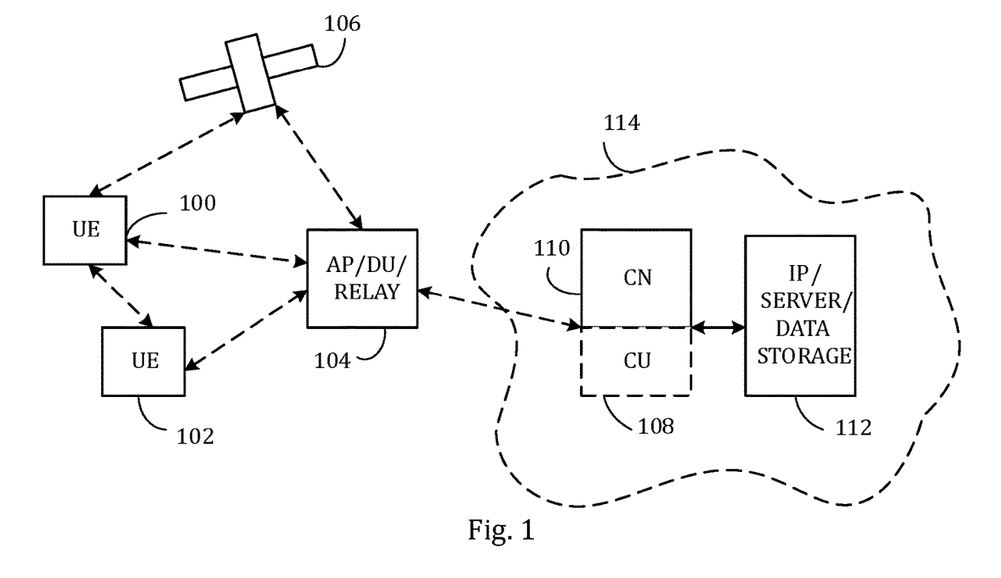
FIG. 1 illustrates an example of a communications system to which embodiments may be applied.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB is called uplink or reverse link and the physical link from the (e/g)NodeB to the user device is called downlink or forward link. It should be appreciated that (e/g)NodeBs or their functionalities may be implemented by using any node, host, server or access point etc. entity suitable for such a usage.

A communications system typically comprises more than one (e/g)NodeB in which case the (e/g)NodeBs may also be configured to communicate with one another over links, wired or wireless, designed for the purpose. These links may be used for signaling purposes. The (e/g)NodeB is a computing device configured to control the radio resources of communication system it is coupled to. The NodeB may also be referred to as a base station, an access point, an access node or any other type of interfacing device including a relay station capable of operating in a wireless environment. The (e/g)NodeB includes or is coupled to transceivers. From the transceivers of the (e/g)NodeB, a connection is provided to an antenna unit that establishes bi-directional radio links to user devices. The antenna unit may comprise a plurality of antennas or antenna elements (possible forming an antenna array). The (e/g)NodeB is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT (information and communications technology) devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integradable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz - cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablet computers and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 112, or utilize services provided by them. The communication system may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 104) and non-real time functions being carried out in a centralized manner (in a centralized unit, CU 108).

It should also be understood that the distribution of labor between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may comprise also other apparatuses, such as physical layer relay nodes or other network elements, etc. At least one of the (e/g)NodeBs may be a Home(e/g)nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g)NodeBs are required to provide such a network structure.

For fulfilling the need for improving the deployment and performance of communication systems, the concept of "plug-and-play" (e/g)NodeBs has been introduced. Typically, a network which is able to use "plug-and-play" (e/g)Node Bs, includes, in addition to Home (e/g)NodeBs (H(e/g)nodeBs), a home node B gateway, or HNB-GW (not shown in FIG. 1). A HNB Gateway (HNB-GW), which is typically installed within an operator's network may aggregate traffic from a large number of HNBs back to a core network.

5G NR networks will have an important role in the future as critical services as electricity, water, heat, etc. are tracked, controlled and charged, to a large extent, over 5G NR networks. Therefore, it is critical to introduce to the 5G NR networks robustness against jamming, quick recovery from jamming, and guaranteed level of service even in the case of intentional (malicious) jamming. Technical disturbances can cause serious financial losses as well as harm and danger to people wellbeing.

Jamming can be intentional (i.e., malicious) or unintentional. A radio jammer is a device that intentionally blocks, jams, or otherwise interferes with a commercial wireless network operating in a licensed frequency band. Although the jammers are illegal and their usage can result in large fines, the jammer devices seem to get more sophisticated. Their blocking range varies from a couple meters up to hundred meters and even thousands of meters. Motivations for using radio jammers may vary. For example, financial benefit can be gained by blocking access to a commercial wireless network and by providing a competing wireless network as a solution. Jamming can also be used for the censorship and pure vandalism.

Typically, jammer devices operate in either wideband or narrowband spectrum. In wideband spectrum, the jammer device transmits a wideband jamming radio signals that degrades the signal-to-noise ratio (SNR) of all channels in both uplink and downlink direction. In narrowband spectrum, the device blocks a specific signal that is essential for the operation of the wireless network, e.g., a synchronization signal. In this case, the jammer device (sometimes called a smart jammer) has to scan the frequency band and detect a target signal and then generate a blocking signal specifically for it.

Unintentional jamming may occur, e.g., when an operator transmits on a busy frequency band without first checking whether it is in use, or without being able to hear neighboring base transceiver stations using the same frequency band. Another form of unintentional jamming occurs when equipment accidentally radiates a signal, such as a cable television plant that accidentally emits on an aircraft emergency frequency.

It is important that a wireless network is able to detect interference signals accurately with minimal latency and provide information to the operator or network handler and possibly also to the customer (i.e., the user of a terminal device). Based on the information provided to network handler, the source of interference can be found and situation can be rectified. Equally important is the capability of being able to avoid significant degradation in the system throughput by using available signal processing tools, e.g., beamforming solutions that null the received energy from the direction of the interference.

The embodiments discussed below in detail seek to provide solutions for interference detection and interference handling in a wireless communication network such as a 5G NR network.

Figure 2:
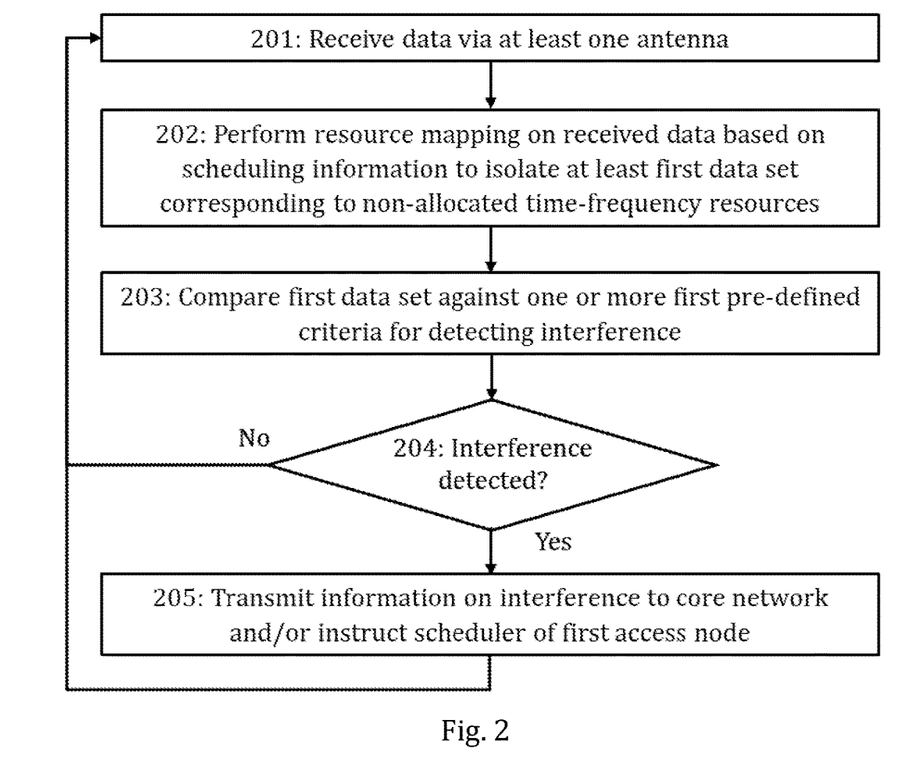
FIGS. 2 to 3 illustrate exemplary processes according to embodiments.

FIG. 2 illustrates a process according to embodiments for performing interference detection. Specifically, FIG. 2 shows a flow chart for a process according to embodiments. The apparatus performing said process may be a computing device. The apparatus performing said process may be or be comprised in a radio receiver or transceiver. Said radio receiver or transceiver may, in turn, be comprised in a first access node such as the access node 104 of FIG. 1. In general, said first access node may be serving one or more terminal devices and/or be connected to a core network. The process of FIG. 2 may be carried out in parallel with normal receiver operation of the first access node. In the following, the device performing the process is called simply an apparatus.

Referring to FIG. 2, the apparatus receives, in block 201, data via at least one antenna of said radio receiver or transceiver. Said data may be specifically received via said at least one antenna followed by a radio frequency (RF) front-end and a digital front-end of the radio receiver or transceiver. Said received data may cover both allocated and non-allocated uplink time-frequency resources (as defined by a layer-2 scheduler). The received data may correspond, e.g., to frequency-domain IQ data derived through various conventional analog and digital operations of the RF and digital front-ends such as basic channel filtering, downconversion and Fast Fourier Transform (FFT). Preferably, the filtering operation are, however, limited to low-pass and/or high-pass filtering below and/or above the carrier bandwidth (i.e., no filtering is preferably carried out in the middle of the carrier bandwidth).

In some embodiments, said at least one antenna may comprise a (massive) MIMO antenna array. In such embodiments, the apparatus and the radio transmitter or transceiver of which the apparatus may form a part may be configured for MIMO operation with digital beamforming. This allows scanning interference power coming from different directions by forming different beams. Alternatively, hybrid or analog beamforming may be supported though it may introduce more latency on the direction estimation.

The apparatus performs, in block 202, resource mapping on the received data based on scheduling information (or scheduler information) defining (currently) allocated uplink time-frequency resources (and/or currently non-allocated uplink time-frequency resources) to isolate or separate at least a first data set corresponding to non-allocated time-frequency resources (i.e., time-frequency resources for which no uplink transmission is expected at this time). Uplink time-frequency resources may be defined as uplink (physical) resource blocks covering both frequency and time domains. The first data set may correspond to a specific subset of all the available non-allocated time frequency resources. In general, the first data set may span one or more physical resource blocks (PRBs) in frequency domain and one or more orthogonal frequency division multiplexing (OFDM) symbols in time domain. The resource mapping may also involve isolating a second data set corresponding to allocated time-frequency resources. Said second data set may be processed by the apparatus or some other unit of the radio receiver or transceiver according to conventional radio receiver processing methodology in parallel with processing described in connection with blocks 203, 204, 205.

The scheduling information may define (at a time) specifically one or more physical resource blocks (PRBs) which may relate to one or more bandwidth parts (BWP) using one or more different subcarrier spacings (SCSs) and to one or more slots. The scheduling information may also define non-allocated uplink time-frequency resources which are available for allocation by the scheduler entity though, in other embodiments, said non-allocated uplink time-frequency resources may be defined or derived implicitly knowing the currently allocated uplink time-frequency resources.

The scheduling information may be acquired via a layer-2 (i.e., data link layer) scheduler entity of the first access node. Said scheduler entity may or may not be implemented in the same apparatus which is carrying out the illustrated interference detection process. The apparatus is, thus, capable of effectively tracking the scheduler decisions. The scheduling information may be maintained in a memory of the apparatus.

New (up-to-date) scheduling information may be acquired continuously or regularly or periodically. The scheduling information may change quite rapidly as a typical scheduling resolution is one slot in, e.g., LTE and 5G NR, but can be even smaller, e.g., if 5G NR mini-slots are employed. The acquired scheduling information may be determined and stored to a memory.

The apparatus compares, in block 203, the first data set against one or more first pre-defined criteria for detecting interference. Said one or more first pre-defined criteria may comprise, for example, at least one pre-defined threshold for power or amplitude and/or average power or amplitude as defined by the first data set (where the average may be taken over frequency and/or time and may be calculated for the whole frequency and/or time range or as a sliding average of frequency and/or time). Here, the power or amplitude and/or average power or amplitude may be assumed to pertain to interference power or amplitude as the first data set relates strictly to non-allocated time-frequency resources. In such a case, interference may be detected when the (average) power or amplitude exceeds an upper predefined threshold comprised in said at least one pre-defined threshold. In practice, the apparatus may generate an interference heat-map over time-frequency resources. Said interference heat map may comprise, e.g., measured interference power per time-frequency resource (e.g., physical resource block, PRB) per Orthogonal Frequency Division Multiplexing (OFDM) symbol based on the time-frequency resources in which measurement is possible. The interference heat map may correspond instantaneous values or be based on sliding time domain averaging.

In general, said at least one pre-defined threshold may comprise one or more upper thresholds and/or one or more lower thresholds. A lower threshold may be employed, e.g., in order to detect whether the antenna(s) is working correctly (i.e., whether a non-zero signal can be measured via the antenna(s)).

In some embodiments, said power or amplitude and/or average power or amplitude for defining said at least one pre-defined threshold may be defined relative to the noise floor. In other embodiments, the one or more pre-defined criteria may comprise a criterion for detecting sweeping behavior in time domain.

In some embodiments where said at least one antenna corresponds to an antenna array capable of beam steering, the one or more first pre-defined criteria used for detecting interference in block 203 (as defined above) may be defined to be dependent on the beam steering direction.

In response to detecting interference from the first data set according to said one or more first pre-defined criteria in block 204, the apparatus may cause, in block 205, transmitting information on the detected interference to a core network (i.e., to a core network node). In other words, the information on the detected interference may be transmitted to a network handler or operator in the core network or connected to the core network. Subsequently, the network handler or the operator may seek to rectify the issue based on the received information. If the apparatus is a physical layer entity, the causing transmitting in block 205 may comprise notifying or triggering higher layers (layer-2 or above) to perform the transmitting.

In a simplistic embodiment, the information on the detected interference may comprise simply a flag indicating that interference has been detected. In other embodiments, the information on the detected interference may comprise information on the first data set and/or results of the comparing in block 204. In some embodiments, the information on the detected interference may also comprise results of further analysis (involving possibly further interference power measurements) performed by the apparatus (possibly in communication with one or more second access nodes) for verifying the detected interference and/or locating its source, as will be described in more detail in connection with FIG. 3. While the initial interference detection (i.e., actions pertaining to blocks 201 to 204) may be carried out on physical layer, said further analysis may involve also higher OSI (Open Systems Interconnection) layers. This further analysis may be triggered by the detection in block 204 and carried out before the action(s) in block 205.

Additionally or alternatively, in response to detecting interference from the first data set according to said one or more first pre-defined criteria in block 204, the apparatus may transmit information or notification to higher layers (layer-2 and above). Specifically, the apparatus may instruct, in block 205, a (layer-2) scheduler entity of the first access node to avoid scheduling uplink time-frequency resources affected by said interference based at least on the comparing in block 203. In some embodiments, the uplink time-frequency resources to be avoided may be determined not only based on the comparing in block 203 but also based on further interference measurements performed using non-allocated and/or allocated time-frequency resources (if such measurements have been carried out).

In other embodiments, said instructing of the scheduler entity in block 205 may be performed in response to receiving a second command to do so from the core network (i.e., from the network handler or operator or other core network node). In such embodiments, the uplink time-frequency resources affected by said interference may be defined in the second command (that is, they may have been determined earlier by a core network node based on information provided by the first access node).

In some embodiments, the apparatus may, alternatively or additionally, instruct, in block 205, the scheduler entity of the first access node specifically to reduce the total number of scheduled uplink time-frequency resources (e.g., PRBs) for allowing for more non-allocated time-frequency resources for interference measurements (namely, for the further analysis discussed above).

Alternatively or additionally, the apparatus may, simultaneously or in parallel with the transmitting the information to higher layers, initiate a set of more detailed measurements, e.g., spatial covariance matrix estimation or storing interference measurements from the second data. This allows to reduce the latency in possible averaging to obtain more reliable interference level, correlation, and direction estimates already when the decision on the possible enabling of more detailed measurements is obtained from higher layer.

In some embodiments, information on the detected interference may be transmitted also to at least one terminal device served by the first access node. In other words, at least one user of at least one terminal device (i.e., a customer of the wireless communication system) served by the first access node may be informed of the detected interference. In this case, the information may be transmitted as downlink control information (DCI).

If no interference is detected from the first data set according to said one or more first pre-defined criteria in block 204, the process may proceed back to block 201, i.e., the apparatus may start processing the next set of received data using a new set of scheduling information.

The interference detection as described in connection with FIG. 2 provides multiple benefits compared to prior art interference detection techniques. Firstly, the utilization of scheduling information to target the measurement to specific radio resources enables accurate interference detection without affecting the normal operation of the network or the receiver or transceiver operation in regard to allocated time-frequency resources (i.e., the second data set). Secondly, the interference detection according to embodiments does not require new signal processing resources. All required operations may be executed using the same signal processing resources implemented for normal receiver operation. Thirdly, the interference detection according to the embodiments allows always-on interference measurements, which reduces the detection time. By controlling the amount of non-allocated resources, the measurement quality is improved and latency of detailed analysis is reduced. This allows providing nearly real-time interference statistics to the network operator, improving the network quality and reducing downtimes. Interference detection time stamps can also be tracked and correlated with customer feedback, allowing network operator to inform customers of degraded network services due to interference of jamming. Fourth benefit of the interference detection according to the embodiments relates in general to measuring antenna domain signals in normal operation mode. One exemplary use case for such antenna domain measurements is broken antenna detection, as mentioned above.

In some embodiments the first access node may support flexible-duplex or full-duplex operation, allowing it to receive and monitor radio environment while transmitting in time-division-duplex operation mode. In such embodiments, the apparatus may scan the radio environment during downlink transmissions so as to try to detect interference signals generated by radio jammers (or other sources of interference) targeting downlink signals, e.g., physical broadcast channels or downlink control channels. Also, if there are non-allocated downlink time-frequency resources, these are one source of information for interference measurements during downlink transmission. Flexible-duplex or Full-duplex like processing is assumed to include the attenuation or removal of the simultaneously transmitted signal from the received signal, making it suitable for data detection or interference measurements.

In pure full-duplex operation, downlink and uplink transmission take place in same time-frequency resources, and similar steps as described above apply to the uplink signal and uplink interference monitoring.

Figure 3:
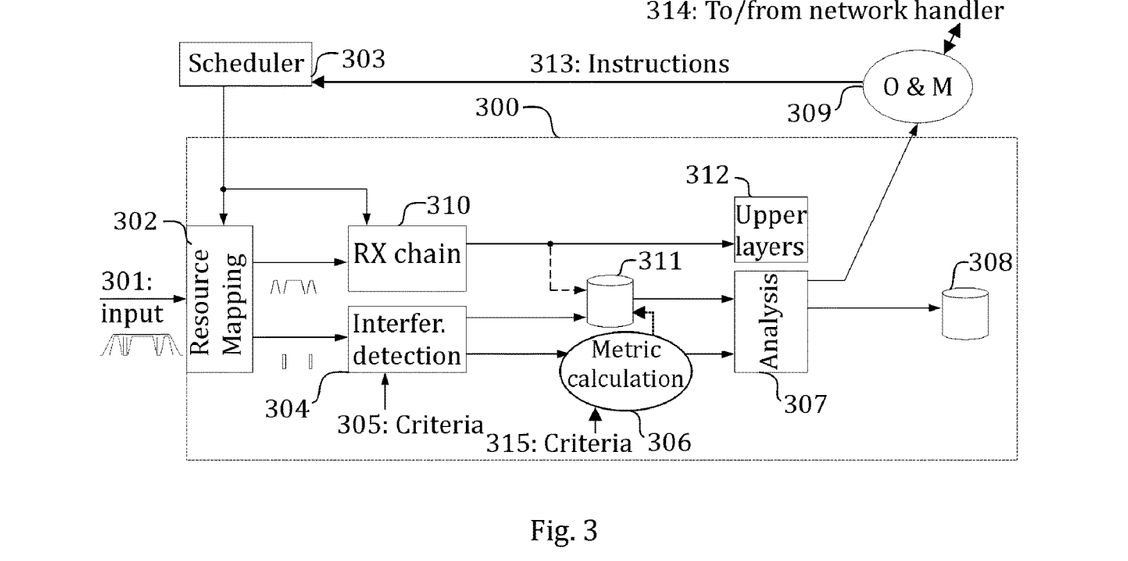

FIG. 3 illustrates a more detailed process according to embodiments for performing interference detection in a first access node. FIG. 3 also illustrates the parallel performing of the normal receiver operation of the radio receiver or transceiver of the first access node. The apparatus performing the process may be a computing device. The apparatus performing the process may be or be comprised in a radio receiver or transceiver. Said radio receiver or transceiver may, in turn, be comprised in a first access node such as the access node 104 of FIG. 1. In general, said access node may be serving one or more terminal devices and/or be connected to a core network. The element 300 (apart from element 312) indicates the physical layer uplink reception and uplink interference detection functionalities which may be carried out by the apparatus while the elements 303, 309 pertain to higher layer (layer-2 and above) functionalities. However, in some embodiments, elements 306 and 307 may also be located at higher layers, at least in part. The term "apparatus" as used in connection with FIG. 2 may correspond here to a (computing) device configured to perform (physical layer) actions pertaining to element 300 or actions pertaining to any of elements of FIG. 3 (i.e., including also the higher layer functions of elements 303, 319). Correspondingly, the device performing the process is called simply an apparatus.

Similar to as described in connection with block 201 of FIG. 2, the apparatus receives, as input, data 301 via at least one antenna of said radio receiver or transceiver (and via a RF front-end and a digital front-end of the radio receiver or transceiver). Said data may be defined as described in connection with block 201 of FIG. 2.

The apparatus performs resource mapping, in block 302, on the received data 301 based on scheduling information received from a layer-2 scheduler 303 to isolate (or separate) from the received data 301 a first data set corresponding to non-allocated time-frequency resources and a second data set corresponding to allocated time-frequency resources. As described in connection with FIG. 2, the scheduling information defines (currently) allocated uplink time-frequency resources. The layer-2 scheduler 303 may be implemented in the apparatus or in some other apparatus (or unit or part) of the first access node.

The second data set corresponding to allocated resources may be processed, by the apparatus, in block 310, according to normal receiver processing (i.e., layer-1 or physical layer processing) of a radio receiver or transceiver of the first access node. The processing in block 310 may also employ scheduling information acquired from the layer-2 scheduler 303.

As part of the normal receiver processing in block 310, the apparatus may calculate values of one or more second measurement metrics based on the second data set and store this additional information derived from the second data set to a database 311. Said one or more second measurement metrics may, in general, be or comprise metrics which are (or can be) indicative of existence of interference. Said one or more second measurement metrics may comprise, e.g., one or more metrics selected from a group comprising a (reference) power level, signal-to-noise ratio, signal-to-interference-plus-noise ratio (SINR) and interference covariance matrix. Said additional information may be used in the interference detection as will be described below. Also, said second data set may be stored to the database 311.

The apparatus may perform or cause performing, in block 312, various upper layer (layer-2 and above) processing functions such as decoding for the second dataset.

The apparatus compares, in block 304, the first data set against one or more first pre-defined criteria 305 for detecting interference. This step may be defined as described in connection with block 203 of FIG. 2. The comparing in block 304 may be carried out, by the apparatus, in a continuous manner (i.e., block 304 may be always "on").

In some embodiments, other type of anomaly detection may also be carried out in block 304 based on the first data set. For example, the noise level of the first data set may be evaluated. A lack of noise in the first data set, i.e., suspiciously low noise, may indicate a broken antenna or other anomaly in receiver chain. On the other hand, very high noise level in the first data set with high(er) energy levels may indicated that the antenna or receiver chain is not working nominally.

The results of the comparing (and possible other analysis) may be stored to the database 311. Said results of the comparing may comprise, for example, information on the first data set itself, the one or more first pre-defined criteria evaluated, value of one or more metrics calculated based on the first data set for performing the comparing such as power or average power and/or information on whether or not interference is detected. The results of the comparing may be stored regardless of whether or not interference is detected or only in the case that interference is detected, depending on the embodiment. Also, said first data set may be stored to the database 311.

In response to detecting interference from the first data set according to said one or more first pre-defined criteria in block 304, a metric calculation process is initiated in block 306. Similar to as described in connection with the normal receiver processing, the apparatus may calculate, in block 306, additional information, i.e., at least values of one or more first measurement metrics, based on the first data set which passed the initial interference detection in block 304. This information may be stored to the database 311. In this case, said one or more first measurement metrics for which values are calculated and optionally stored may comprise, e.g., one or more metrics quantifying the detected interference signal selected from a group comprising:

power level of the detected interference,
average power level (or a weighted average power level) of the detected interference,
duration of the detected interference (i.e., a duration of the interference signal),
bandwidth of the detected interference,
occurrence frequency of the detected interference and
a metric quantifying sweeping nature or other kind of continuous presence of high(er) energy (compared to noise level) in the detected interference (high energy being defined, e.g., as energy higher than a pre-defined energy threshold).

One or more of said one or more metrics may be evaluated in a cumulative manner over a certain time window or heat map. The first one or more measurement metrics may be metrics whose calculation is more time-consuming and/or computational resource intensive compared to any metrics calculated in block 304 for each first data set (regardless of whether any interference exists).

The metric calculation process in block 306 may trigger further analysis 307 regarding the detected interference if one or more second pre-defined criteria 315 defined for said one or more first measurement metrics are satisfied. By providing this secondary, more in-depth interference detection step, false alarms may be avoided. For example, if the one or more first measurement metrics comprise a duration of the interference signal, the one or more second pre-defined criteria 315 may comprise a pre-defined length for said duration. In such cases, interference signals having a duration shorter than the pre-defined length may be discarded in block 306. To give another example, a single detection in block 304 may easily be a false alarm so the one or more second pre-defined criteria 315 may comprise a pre-defined value for occurrence frequency of the interference. In other words, the further analysis 307 may be triggered only if the pre-defined length for the duration of the interference signal is reached.

In some embodiments, the metric calculation block 306 may define one or more metrics which are used by the analysis block 307, e.g., bandwidth for the more accurate analysis.

The functions pertaining to block 306 may be carried out by the apparatus or by a separate device or unit of the access node or communicatively connected to the access node. In some embodiments, the block 306 may be omitted or combined with block 304 so that block 304 triggers the further analysis 307.

If interference is detected, the interference detection on the physical layer (i.e., layer-1) in block 307 may notify higher layers 309 (layer-2 and above) or specifically Observations and Measurements (O & M) management entity 309 of the first access node regarding the detected interference (i.e., regarding the suspected jammer). This triggering may enable the apparatus, e.g., to instruct, as illustrated by arrow 313, the scheduler 303 to modify the scheduling of time-frequency resources. For example, the scheduler 303 may be instructed, in message 313, to avoid using time-frequency resources affected by interference based at least on the comparing in block 304 and/or block 306. In other words, the layer-2 allocation or scheduling decisions may be altered to overcome or alleviate the interference issue. The time-frequency resources affected by interference may comprise time-frequency resources directly detected to suffer from interference and/or time-frequency resources neighboring (in frequency and/or time domain) any such time-frequency resources.

Additionally or alternatively, the scheduler 303 may be instructed to reduce the total number of time-frequency resources allocated for facilitating performing of further (verification) measurements using non-allocated resources (to be discussed below in more detail).

The higher layer functions (O & M) 309 may also affect the operation in block 304 by modifying the one or more first pre-defined criteria 305 and/or the metric calculation 306 and/or the analysis in block 307 by modifying the one or more second pre-defined criteria 315. For example, based on higher layer decision-making in element 309, the processing applied on interference measurements may be changed, e.g., going from generating a basic interference power heat-map to covariance matrix and beam direction estimation.

The apparatus may subsequently verify detection of the interference by performing one or more measurements at least by the first access node itself using non-allocated time-frequency resources affected by interference. Here, the non-allocated time-frequency resources may or may not comprise the same (current) non-allocated (or a part thereof) based on which the initial detection was made (depending on the current scheduling situation). In general, the non-allocated time-frequency resources affected by interference and used in the one or more measurements may be selected based on up-to-date scheduling information derived from the scheduler 303 and information on the detected interference derived based on the interference detection in any of blocks 304, 306, 307 and/or maintained in the database 311. By focusing the further analysis on non-allocated resources, efficient uplink interference and jamming detection without disrupting normal network operation running in parallel is enabled.

In some embodiments, the verification functionality (and associated measurements) may be triggered by reception 314 of a first command from the core network (i.e., from a core network node). Said first command may comprise information defining the one or more measurements to be carried out (e.g., time-frequency resources to be used and/or post-processing to be carried out) and/or criteria for verification of the interference.

In the simplest alternative, the apparatus may simply perform one or more further power measurements using non-allocated time-frequency resources. In other embodiments, the apparatus may cause detection of a direction of a source of the interfering signal (i.e., an angle of arrival for the interfering signal) or even detection of a location of a source of the interfering signal (in co-operation with one or more second access nodes communicatively connected to the first access node) using an angle-of-arrival estimation method (or other spatial domain processing technique for determining direction or location of the source of interference) employing non-allocated time-frequency resources.

The angle-of-arrival estimation method when performed by the first access node may comprise, for example, measuring received power, using non-allocated time-frequency resources at a plurality of beam steering angles. These measurements may be carried out using electrical or mechanical beam steering. In electrical beam steering, the direction of the main lobe of a reception radiation pattern of the radio receiver or transceiver is changed by adjusting the relative phase shifts applied to RF signals received by the individual antenna elements of an antenna array of the radio receiver or transceiver. Delay and Sum is an example of a specific electrical beamsteering-based AoA technique which may be used. In mechanical beam steering, the direction of the main lobe of a reception radiation pattern of the radio receiver or transceiver is changed by physically rotating at least one antenna of the radio receiver or transceiver. The angle of arrival may be determined based on the relative power levels measured using different beam steering angles.

Alternatively, the angle-of-arrival estimation method when performed by the first access node with an antenna array may correspond to a subspace technique (i.e., it may be based on the idea that the signal subspace is orthogonal to the noise subspace).

As mentioned above, in some embodiments, the further analysis based on an angle-of-arrival estimation method may involve co-ordination of a plurality of measurements by a plurality of access nodes to determine the exact location of the source of the interfering signal. This may involve, first, causing (or triggering), by the apparatus, performing of measurements of angle of arrival using any of the methods described above. Here and in the following, the plurality of access nodes may comprise (or consist of) the first access node itself and one or more second access nodes communicatively connected to said first access node or alternatively a plurality of second access nodes communicatively connected to said first access nodes. The plurality of access nodes may use the same non-allocated time-frequency resources (or at least the same frequency range) for the measurements. The second access nodes may be neighboring access nodes to the first access node.

The measurements by the plurality of access node may be orchestrated, e.g., by the O & M entity 309 of the first access node (possibly upon being triggered to do so by the programmable decision-making and/or analysis entity 307). The O & M entity 309 may have visibility on all the plurality of access nodes and may also receive an indicator of jamming from multiple access node located in the same region. The apparatus (e.g., the O & M entity 309) may communicate with the second access node(s) (directly or via the core network) so as to instruct them to perform measurement(s) of the angle of arrival using said non-allocated time-frequency resources or a part thereof. The measurements by the plurality of access nodes may be performed as described in the previous paragraph for the first access node. The apparatus may receive, following the performing of the measurements, results of measurements performed by any secondary access nodes from said secondary access node(s). Based on the results of the measurements of received power performed by the plurality of access nodes, the apparatus (or specifically the O & M entity 309) may estimate the location of the source of the interference (e.g., using triangulation).

Alternatively, the verification of the detection of the interference may involve performing a plurality of (synchronized) time of arrival (ToA) measurements by said plurality of access nodes using non-allocated time-frequency resources affected by interference. The procedure may be orchestrated by the first access node or specifically by its O & M entity 309 in a similar manner as described for the angle-of-arrival measurements (apart from the difference in the type of measurement performed). Also in this case, the apparatus may receive, following the performing of the ToA measurements, results of measurements performed by any secondary access nodes from said secondary access node(s). Subsequently, the apparatus may estimate the location of the source of the interference based on the results of the ToA measurements performed by the plurality of access nodes. Specifically, the apparatus may calculate time difference of arrival (TDoA) values for pairs of the plurality of access nodes based on the ToAs measured by the plurality of access nodes and then use trilateration or multilateration for locating the source of the interference. Here, it may be assumed that the locations of the access nodes are known to the apparatus.

The apparatus (or specifically, e.g., the analysis entity 307 and/or the O & M entity 309) may, following the performing of the measurements by the first access node or the plurality of access nodes, analyze results of the measurements for verifying existence of the detected interference (i.e., for determining whether significant interference does, in fact, exist). The apparatus may, for example, evaluate whether the angle-of-arrival estimation method was successful in finding the source of the interference and/or whether the (average) power measured by the first access node (or by at least one of the plurality of access nodes) was above a pre-defined limit. As mentioned above, in some embodiments, said criteria may be received from the core network.

In some embodiments, the verification may, also or alternatively, be based on information maintained in the database 311 derived from the first data set associated with non-allocated time-frequency resources and/or the second data set associated with the allocated time-frequency resources. For example, the verification may take into account an interference power heat-map over the non-allocated and/or allocated time-frequency resources as derived based on the first and/or second data sets, respectively. To give another example, in time division duplexing operation, during uplink signal reception, an indication of interference may be generated in block 304 and subsequently used in block 306 for deciding to analyze the received signal more accurately. In some instances, this process may postponed until the end of uplink slot and carried out during the next downlink slot. For this reason, the first and second data set may be (temporarily) stored to the database 311 for subsequent processing, in block 307, in the following downlink slot.

In other embodiments, the aforementioned analysis for verifying existence of the detected interference may be carried out by a core network node (e.g., a network handler node) based on information transmitted to it by the first access node and optionally one or more other access nodes. In such embodiments, the positive or negative result of the verification may be transmitted, by the core network node, back to the first access node and optionally to one or more other access nodes.

The apparatus may cause transmitting (via said higher layers) information on the detected interference to a core network (e.g., to a core network node acting as a network handler), as illustrated with element 314. Said transmission may be triggered by any of elements 304, 306, 307 or 309 (depending on how different tasks are distributed between them). The transmitted information on the interference may comprise information relating to the initial detection of the interference and/or to the further analysis (e.g., verification).

In some embodiments, the apparatus may adjust at least one tunable (digital) filter of said radio receiver or transceiver (or specifically a digital front-end) for enabling or facilitating the performing of the measurements using non-allocated time-frequency resources. Specifically, the adjusting may be performed so as to allow interference measurements using time-frequency resources which are conventionally filtered out by the digital front-end (see Areas 3 & 4 of FIG. 4).

The analysis in block 307 may be carried out online (i.e., immediately) or offline (i.e., at a later date). The apparatus may store information on the analysis performed in block 307 to a database 308 for later analysis. While illustrated in FIG. 3 as separate databases, the databases 308, 311 may correspond to the same database, in some embodiments. A basic pre-processing may be performed to reduce amount of information to be stored for later off-line analysis. Such basic pre-processing may comprise, for example, compressing the IQ samples into time averaged interference power heat-maps, averaging over time, frequency and/or spatial domains allows to efficiently compress information, with the cost of reduced resolution.

In some embodiments, the entities 304, 306, and/or 307 may be based on machine learning. In such embodiments, different service, environment, or accuracy requirements may be applied to different used pre-trained machine-learning models.

Figure 4:
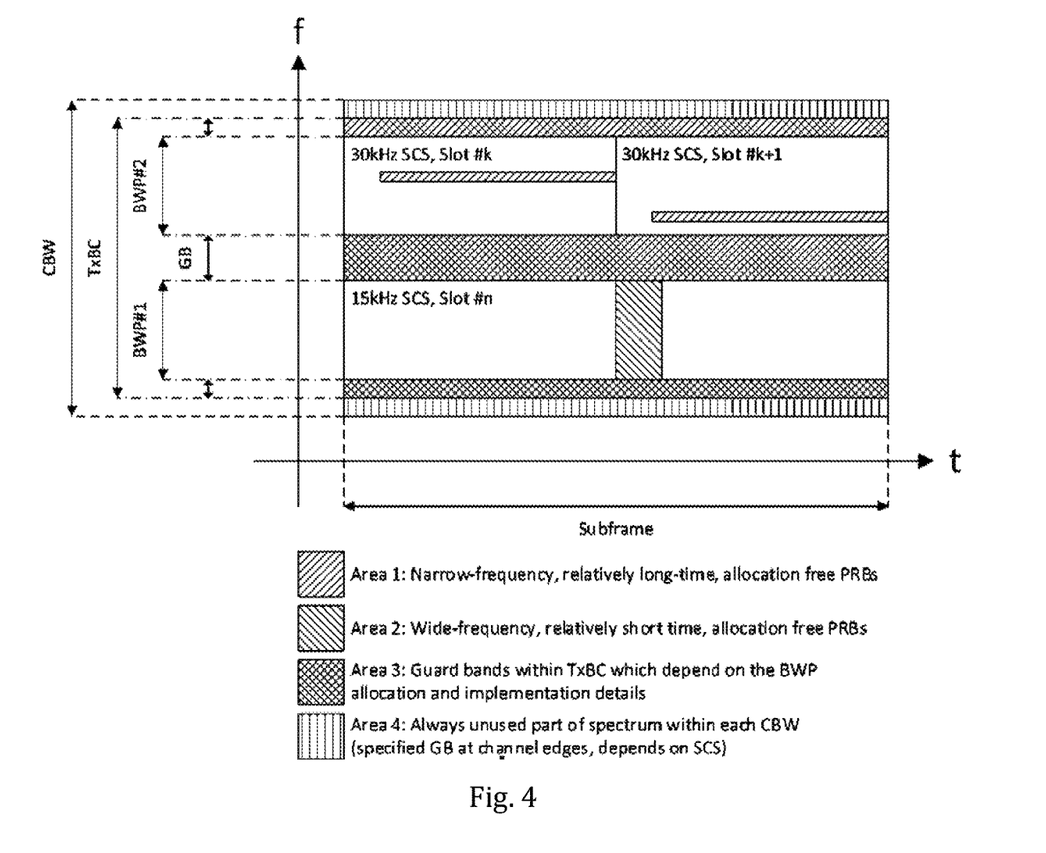
FIG. 4 illustrates examples of user-allocation-free time-frequency resources during normal operation in 5G NR radio interface which may be employed in embodiments.

FIG. 4 illustrates an example of an uplink subframe in 5G NR system. Specifically, FIG. 4 illustrates two bandwidth parts (BWP) that utilize different sub-carrier spacings (SCS). The two bandwidth parts, denoted as BWP#1 and BWP#2, are separated by guard bands (GB). FIG. 4 highlights four different types of scheduler information that can be used in the resource mapping of FIG. 2 or 3 to select the most appropriate resource element for performing the interference detection and measurement(s). All of the illustrated areas represent time-frequency resources which are non-allocated, i.e., no uplink signal is expected to appear here according to the scheduling information. Usually, the illustrated non-allocated time-frequency resources are simply discarded by the access node in reception. Typically, the scheduling decisions are done with slot resolution, but here subframe timing is used for presentation clarity.

Area 1 illustrates non-allocated physical resource blocks (PRB) within a BWP. These areas could be very narrow in the frequency direction but span over several symbols in the uplink slot. The longer duration allows to collect sufficient amount of energy for reliable interference detection. As the location of non-allocated PRBs typically changes from slot to slot, individual measurements can be aggregated to form a wideband measurement. Within a carrier or a BWP, multiple narrow-frequency non-allocated resource sets may occur within a slot. In one embodiment, physical random access channel (PRACH) allocation may also be considered as a narrow-frequency non-allocated resource set with dedicated interference criteria. For these resources, the access node does not know whether or not a signal exists.

In an embodiment, physical uplink control channel (PUCCH) related information stored to a database (e.g., the database 311 of FIG. 3) may be emphasized in the process 306 of FIG. 3 with possible additional analysis in block 307 before making a decision about signaling O&M 309. This is due to the assumption that a smart jammer would focus interference on PUCCH resources.

Area 2 illustrates an example of a wideband allocation that has a relatively short duration. These sorts of areas occur in 5G NR systems utilizing mini slots, which are applicable to ultra-reliable and low-latency communications. This type of area is well suited for wideband interference measurements and provides a good snapshot of the instantaneous interference profile.

The definitions of Areas 1 & 2 depend directly on scheduling decisions made by the layer-2 scheduler. BWP#1 and BWP#2 as a whole are typically isolated from the received signal by filtering in the digital front-end of the radio receiver or transceiver and provided to the apparatus according to embodiments. Correspondingly, Areas 1 & 2 correspond to the first data set and the rest of BWP#1 and BWP#2 may correspond to the second data set as defined above.

Area 3 illustrates guard bands between BWPs, and guard bands between the BWP and transmission bandwidth configuration (TxBC) edge. These resources are always available in 5G NR systems when multiple BWPs are supported, and they are especially suited for monitoring wideband interference.

Area 4 illustrates unused resources between the TxBC edges and channel bandwidth (CBW) edges. The amount of guard band in this region depends on the channel bandwidth and the SCS used in the BWP closest to the CBW edge. This region of time-frequency resources is available for wideband interference measurements or narrowband frequency hopping of frequency sweeping interference in 5G NR and other radio technologies, e.g., LTE (4G technology).

Areas 3 and 4 highlight available resources which are typically discarded, but which could be used to estimate the wideband interference level. Most likely no intelligent jammers operate at Areas 3 and 4. However, if wideband jammer(s) or source(s) of interference exist, they could be detected also based on energy in Areas 3 & 4. Areas 3 & 4 may be typically filtered out by the digital front end and may not be visible for the physical layer processing as performed by the apparatus according to embodiments. Therefore, in order to utilize these types of time-frequency resources in embodiments, information on these resources needs to be provided to the apparatus. Thus, in some embodiments, the apparatus may adjust (e.g., as a part of the verifying of the detection of the interference) at least one tunable digital filter of the radio receiver or transceiver of the first access node for enabling or facilitating the reception and the performing of the measurements at time-frequency resources corresponding to Area 3 and/or Area 4 of FIG. 4.

As mentioned above, Areas 1-4 illustrate different types of scheduler information that can be used to target the interference measurement to particular radio resources. Common to all the presented areas is that their size depends on scheduler decision. In addition, the location of areas 1-3 in time-frequency grid varies from slot to slot based on the scheduler decisions. It should be noted, that if we want to use these areas for interference measurements, the digital front-end (DFE) must have the capability to communicate information on said resources to the interference detection entity (block 304 and/or 307 of FIG. 3).

Being able to track scheduler decisions enables the access node (or a particular unit thereof) to measure interference with a very fine time-frequency resolution. This capability provides a good interference resilience against even the smartest jammers. Due to the rapidly changing (from slot to slot) interference estimation areas the presented solution provides superior performance. Jamming and other type of malicious interference can be detected, since the interference source is not able to follow the dynamics of uplink allocations. Even if there would be an intelligent jammer device, it is very unlikely that it could predict the scheduler decision and therefore the measurements carried out in the access node. Moreover, all of these resources are available during normal operation, allowing efficient monitoring of interference and jamming without excessive overheads.

Embodiments may also enable detection of remote interference (RI) using non-allocated resources. Remote interference management (RIM) is especially critical in time division duplexing (TDD) based networks where, due to the atmospheric ducting phenomenon, the downlink signal transmitted by an access node may be carried hundreds of kilometers in a certain atmospheric layer and thus interfere the uplink reception of another access node. There are dedicated reference signals defined for this in 3GPP, but the embodiments described above may provide an alternative or additional tool for detecting remote interference. For example, noting that increased interference appears only in the beginning of the uplink slot could be used interpreted as an indicator of existence of remote interference.

Embodiments may also enable detection of downlink-uplink interference using non-allocated resources. If the network is using flexible or access node-specific downlink-uplink allocations per slot, it is possible that neighboring access nodes are simultaneously using transmit and reception directions at a given time. In other words, a first access node may be receiving an uplink signal while a second access node neighboring the first access node may be transmitting a downlink signal (or vice versa). This is denoted typically as cross-link interference (CLI). The embodiments may be used to identify increased interference caused by the cross-link interference. The interference may be specifically identified as downlink-uplink interference by upper layers based on detailed analysis, using, e.g., information related to downlink-uplink scheduling decisions per access node and interference measurements. It should be noted that RIM is a special case of CLI.

In summary, the technical benefits of the embodiments comprise at least the following:

Efficient, real-time interference and jamming detection during normal operation conditions (even for smart jammers).

Utilizing scheduling information to target the measurement to specific radio resources improves interference detection and reduces computational overhead and detection latency.

More accurate and lower latency interference detection without affecting the normal operation.

Required measurements can be executed using the same signal processing resources implemented for normal receiver operation.

Receiver capacity is defined based on maximum number of PRBs. Thus, if some of the PRBs are unallocated, there are computational resources to process these PRBs for interference and jamming detection.

Easier network setup, quality and health monitoring through always on interference measurements.

Better network quality through real-time and always on interference monitoring.

Reduced network downtimes in the case of jamming or severe interference.

Improved support for critical services envisioned for 5G and beyond wireless communication networks.

Fast identification of interference (e.g., it can be identified from which direction the interference is coming)

Broken antenna detection is enabled (e.g., by defining a lower pre-defined threshold for detection).

RI and/or CLI detection is enabled.

Figure 5:
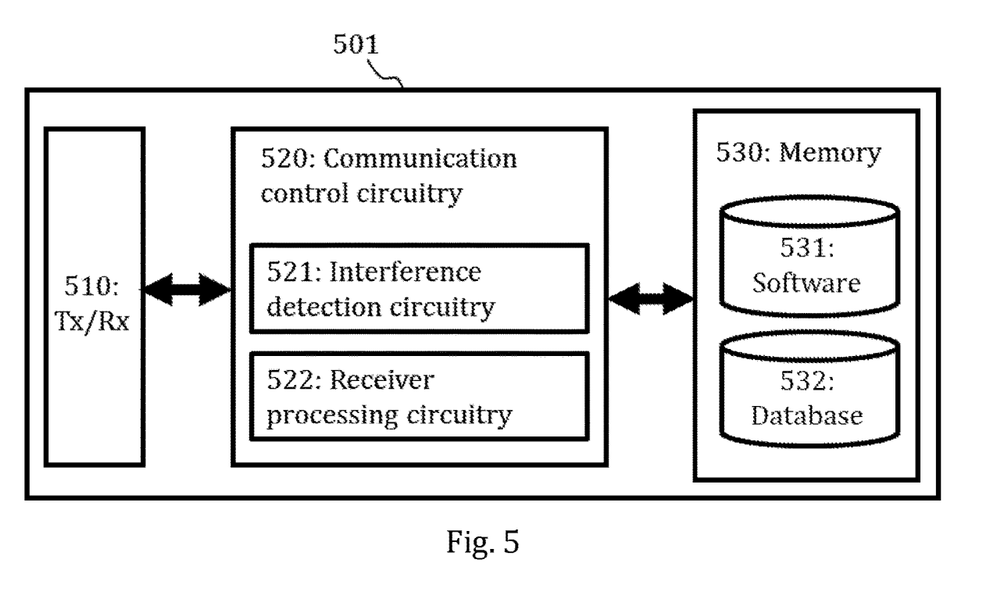
FIG. 5 illustrates an exemplary apparatus according to embodiments.

FIG. 5 illustrates an exemplary apparatus 501 configured to carry out at least the functions described above in connection with at least some of the processes illustrated in FIG. 2 or 3. The apparatus may be an electronic device comprising electronic circuitries. The apparatus may be a separate entity or a plurality of separate entities. The apparatus may comprise a communication control circuitry 510 such as at least one processor, and at least one memory 530 including a computer program code (software) 531 wherein the at least one memory and the computer program code (software) are configured, with the at least one processor, to cause the apparatus to carry out any one of the embodiments of an apparatus for radio receiver or transceiver of an access node described above.

The memory 530 may be implemented using any suitable data storage technology, such as semiconductor based memory devices, flash memory, magnetic memory devices and systems, optical memory devices and systems, fixed memory and removable memory. The memory may comprise a database 532 which may be or comprise the database as described in relation to previous embodiments. The memory 530 may be connected to the communication control circuitry 520 via an interface.

The apparatus may further comprise interfaces 510 comprising hardware and/or software for realizing connectivity according to one or more communication protocols. The interfaces 510 may comprise, for example, interfaces enabling the connections between the apparatus 501 and other apparatuses as described, e.g., in relation to FIGS. 1, 2 and 3. In some embodiments, the interfaces 510 may provide the apparatus with communication capabilities to communicate in the cellular communication system and enable communication with network nodes (e.g., access nodes), terminal devices and one or more core network nodes, for example. The interfaces 510 may comprise standard well-known components such as an amplifier, filter, frequency-converter, (de)modulator, and encoder/decoder circuitries and one or more antennas (in some embodiments, specifically an antenna array comprising a plurality of antenna elements).

Referring to FIG. 5, the communication control circuitry 520 may comprise interference detection circuitry 521 configured to perform the interference detection (and verification thereof) according to any of embodiments illustrated in FIGS. 2 to 4. The communication control circuitry 520 may also comprise receiver processing circuitry 522 configured to perform conventional reception functionalities in parallel with the interference detection as discussed in connection with elements 301, 302, 310, 312 of FIG. 3.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

In an embodiment, at least some of the processes described in connection with FIGS. 2 to 4 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 4 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

According to an aspect, there is provided an apparatus for a radio receiver or transceiver of a first access node, the apparatus comprising means for performing:

receiving data via at least one antenna of said radio receiver or transceiver;

performing resource mapping on the received data based on scheduling information defining currently allocated uplink time-frequency resources to isolate at least a first data set corresponding to non-allocated uplink time-frequency resources;

comparing the first data set against one or more first pre-defined criteria for detecting interference; and in response to detecting interference in the first data set according to said one or more first pre-defined criteria, causing transmitting information on the detected interference to a core network.

According to an aspect, there is provided an apparatus for a radio receiver or transceiver of a first access node, the apparatus comprising means for performing any of the embodiments of the methods described in connection with any of FIGS. 2 to 4.

Embodiments as described may also be carried out in the form of a computer process defined by a computer program or portions thereof. Embodiments of the methods described in connection with FIGS. 2 to 4 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

According to an embodiment, there is provided a computer program comprising instructions for causing an apparatus to perform any of the embodiments of the methods described in connection with any of FIGS. 2 to 4.

According to an embodiment, there is provided a computer readable medium comprising program instructions for causing an apparatus to perform any of the embodiments of the methods described in connection with any of FIGS. 2 to 4.

According to an embodiment, there is provided a non-transitory computer readable medium comprising program instructions for causing an apparatus to perform any of the embodiments of the methods described in connection with any of FIGS. 2 to 4.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for a radio receiver or transceiver of a first access node, the apparatus comprising:
   at least one processor; and
   at least one memory including computer program code, the at least one memory and computer program code configured to, with the at least one processor, cause the apparatus to perform:
   receiving data via at least one antenna of said radio receiver or transceiver;
   performing resource mapping on the received data based on scheduling information defining currently allocated uplink time-frequency resources to isolate at least a first data set corresponding to non-allocated uplink time-frequency resources;
   comparing the first data set against one or more first pre-defined criteria for detecting interference;
   in response to detecting interference in the first data set according to said one or more first pre-defined criteria, causing transmitting information on the detected interference to a core network; and
   in response to the detecting of the interference in the first data set according to said one or more first pre-defined criteria or in response to receiving a first command from the core network following the transmitting, verifying detection of the interference by
      adjusting at least one tunable digital filter of said radio receiver or transceiver for enabling reception and performing of one or more measurements at one or more non-allocated time-frequency resources corresponding to a guard band between two bandwidth parts and/or a guard band between a bandwidth part and a transmission bandwidth configuration edge and/or at one or more non-allocated time-frequency resources between a transmission bandwidth configuration edge and a channel bandwidth edge, and
      causing the performing of the one or more measurements at least by the first access node using non-allocated time-frequency resources comprising said one or more non-allocated time-frequency resources following the adjusting.

2. An apparatus for a radio receiver or transceiver of a first access node, the apparatus comprising:
   at least one processor; and
   at least one memory including computer program code, the at least one memory and computer program code configured to, with the at least one processor, cause the apparatus to perform:
   receiving data via at least one antenna of said radio receiver or transceiver;
   performing resource mapping on the received data based on scheduling information defining currently allocated uplink time-frequency resources to isolate at least a first data set corresponding to non-allocated uplink time-frequency resources;
   comparing the first data set against one or more first pre-defined criteria for detecting interference;
   in response to detecting interference in the first data set according to said one or more first pre-defined criteria, causing transmitting information on the detected interference to a core network;

in response to the detecting of the interference in the first data set according to said one or more first pre-defined criteria, calculating one or more values of one or more first measurement metrics quantifying the detected interference based on the first data set, wherein the one or more first measurement metrics in the first data set comprise one or more metrics selected from a group comprising: a duration of the detected interference, power level of the detected interference, average power level of the detected interference, a bandwidth of the detected interference, occurrence frequency of the detected interference, a metric quantifying sweeping nature or continuous presence of energy higher than a pre-defined energy threshold in the detected interference; and in response to detecting interference in the first data set according to one or more second pre-defined criteria defined for the one or more values of the one or more first measurement metrics, verifying detection of the interference by adjusting at least one tunable digital filter of said radio receiver or transceiver for enabling reception and performing of one or more measurements at one or more non-allocated time-frequency resources corresponding to a guard band between two bandwidth parts and/or a guard band between a bandwidth part and a transmission bandwidth configuration edge and/or at one or more non-allocated time-frequency resources between a transmission bandwidth configuration edge and a channel bandwidth edge, and causing the performing of the one or more measurements at least by the first access node using non-allocated time-frequency resources comprising said one or more non-allocated time-frequency resources following the adjusting.

3. The apparatus of claim 1, wherein the at least one memory and the computer program code are configured, with the at least one processor, to cause the apparatus to perform:

acquiring the scheduling information from a data link layer scheduling entity of the first access node.

4. The apparatus according to claim 1, wherein the at least one memory and the computer program code are configured, with the at least one processor, to cause the apparatus to perform in response to the detecting of the interference in the first data set according to said one or more first pre-defined criteria or in response receiving a second command from the core network following the transmitting:

instructing a data link layer scheduler entity of the first access node to avoid scheduling uplink time-frequency resources affected by said interference based at least on the comparing.

5. The apparatus according to claim 1, wherein the verifying of the detection of the interference comprises, before performing the one or more measurements:

instructing a data link layer scheduler entity of the first access node to reduce the total number of scheduled uplink time-frequency resources for allowing for more non-allocated time-frequency resources for interference measurements.

6. The apparatus according to claim 1, wherein the verifying of the detection of the interference comprises:

causing measuring, by the first access node, received power using said non-allocated time-frequency resources; and/or causing measuring, by the first access node, an angle of arrival for an interfering signal using said non-allocated time-frequency resources using an angle-of-arrival estimation method.

7. The apparatus according to claim 1, wherein the verifying of the detection of the interference comprises:

causing measuring an angle of arrival or a time of arrival by a plurality of access nodes, wherein the plurality of access nodes comprises the first access node and one or more second access nodes communicatively connected to said first access node or a plurality of second access nodes communicatively connected to said first access node;

receiving results of one or more angle of arrival or time of arrival measurements performed by at least one secondary access node; and estimating the location of the source of the interference based on results of angle of arrival or time of arrival measurements performed by the plurality of access nodes.

8. The apparatus of claim 7, wherein the at least one memory and the computer program code are configured, with the at least one processor, to cause the apparatus to perform either:

causing the measuring of the angle of arrival by the plurality of access nodes, wherein the angle of arrival measurements are based on measuring power at a plurality of beam steering angles;

receiving the results of the one or more angle of arrival measurements performed by said at least one secondary access node; and performing the estimating of the location of the source of the interference based on the results of the angle of arrival measurements using triangulation; or causing the measuring of the time of arrival by the plurality of access nodes;

receiving the results of the one or more time of arrival measurements performed by said at least one secondary access node; and performing the estimating of the location of the source of the interference using trilateration or multilateration based on time difference of arrival values calculated for pairs of the plurality of access nodes, wherein the time difference of arrival values are calculated based on results of the time of arrival measurements.

9. The apparatus according to claim 1, wherein the at least one memory and the computer program code are configured, with the at least one processor, to cause the apparatus to perform the causing of the transmitting of the information on the interference to the core network only in response to results of the verifying confirming the detection.

10. The apparatus according to claim 9, wherein the information on the interference comprises also information on the results of the verifying.

11. The apparatus according to claim 1, wherein the at least one memory and the computer program code are configured, with the at least one processor, to cause the apparatus to verify the detection in response to the receiving of the first command comprising information defining the one or more measurements to be carried out and to further cause the apparatus to perform:

transmitting information on results of the verifying to the core network; and in response receiving a second command from the core network following the transmitting of the information on the results of the verifying, instructing a data link layer scheduler entity of the first access node to avoid scheduling uplink time-frequency resources affected by said interference according to the second command.

12. The apparatus according to claim 1, wherein the at least one memory and the computer program code are configured, with the at least one processor, to cause the apparatus to perform:
    performing resource mapping on the received data based on the scheduling information to isolate also a second data set corresponding to allocated time-frequency resources;
    calculating values of one or more second measurement metrics based on the second data set, wherein said one or more measurement metrics comprise one or more selected from a group comprising a power level, signal-to-noise ratio, signal-to-interference-plus-noise ratio and interference covariance matrix; and
    performing the verifying also based on the values of the one or more second measurement metrics.

13. The apparatus according to claim 1, wherein the at least one memory and the computer program code are configured, with the at least one processor, to cause the apparatus to perform:
    performing resource mapping on the received data based on the scheduling information to isolate also a second data set corresponding to allocated time-frequency resources; and
    processing the second data set for reception in parallel with interference detection.

14. The apparatus according to claim 1, wherein the one or more first pre-defined criteria comprise at least one pre-defined threshold for power or amplitude and/or average power or amplitude.

15. A method, comprising:
    receiving data via at least one antenna of a radio receiver or transceiver of a first access node;
    performing resource mapping on the received data based on scheduling information defining currently allocated uplink time-frequency resources to isolate at least a first data set corresponding to non-allocated uplink time-frequency resources;
    comparing the first data set against one or more first pre-defined criteria for detecting interference;
    in response to detecting interference in the first data set according to said one or more first pre-defined criteria, causing transmitting information on the detected interference to a core network; and
    in response to the detecting of the interference in the first data set according to said one or more first pre-defined criteria or in response to receiving a first command from the core network following the transmitting, verifying detection of the interference by
    adjusting at least one tunable digital filter of said radio receiver or transceiver for enabling reception and performing of one or more measurements at one or more non-allocated time-frequency resources corresponding to a guard band between two bandwidth parts and/or a guard band between a bandwidth part and a transmission bandwidth configuration edge and/or at one or more non-allocated time-frequency resources between a transmission bandwidth configuration edge and a channel bandwidth edge, and
    causing the performing of the one or more measurements at least by the first access node using non-allocated time-frequency resources comprising said one or more non-allocated time-frequency resources following the adjusting.

16. A method, comprising:
    receiving data via at least one antenna of a radio receiver or transceiver of a first access node;
    performing resource mapping on the received data based on scheduling information defining currently allocated uplink time-frequency resources to isolate at least a first data set corresponding to non-allocated uplink time-frequency resources;
    comparing the first data set against one or more first pre-defined criteria for detecting interference;
    in response to detecting interference in the first data set according to said one or more first pre-defined criteria, causing transmitting information on the detected interference to a core network;
    in response to the detecting of the interference in the first data set according to said one or more first pre-defined criteria, calculating one or more values of one or more first measurement metrics quantifying the detected interference based on the first data set, wherein the one or more first measurement metrics in the first data set comprise one or more metrics selected from a group comprising: a duration of the detected interference, power level of the detected interference, average power level of the detected interference, a bandwidth of the detected interference, occurrence frequency of the detected interference, a metric quantifying sweeping nature or continuous presence of energy higher than a pre-defined energy threshold in the detected interference; and
    in response to detecting interference in the first data set according to one or more second pre-defined criteria defined for the one or more values of the one or more first measurement metrics, verifying detection of the interference by
    adjusting at least one tunable digital filter of said radio receiver or transceiver for enabling reception and performing of one or more measurements at one or more non-allocated time-frequency resources corresponding to a guard band between two bandwidth parts and/or a guard band between a bandwidth part and a transmission bandwidth configuration edge and/or at one or more non-allocated time-frequency resources between a transmission bandwidth configuration edge and a channel bandwidth edge, and
    causing the performing of the one or more measurements at least by the first access node using non-allocated time-frequency resources comprising said one or more non-allocated time-frequency resources following the adjusting.

17. A non-transitory computer-readable medium storing a set of instructions for causing an apparatus to perform at least:
    receiving data via at least one antenna of a radio receiver or transceiver of a first access node;
    performing resource mapping on the received data based on scheduling information defining currently allocated uplink time-frequency resources to isolate at least a first data set corresponding to non-allocated uplink time-frequency resources;
    comparing the first data set against one or more first pre-defined criteria for detecting interference;
    in response to detecting interference in the first data set according to said one or more first pre-defined criteria, causing transmitting information on the detected interference to a core network; and
    in response to the detecting of the interference in the first data set according to said one or more first pre-defined criteria or in response to receiving a first command from the core network following the transmitting, verifying detection of the interference by
  adjusting at least one tunable digital filter of said radio receiver or transceiver for enabling reception and performing of one or more measurements at one or more non-allocated time-frequency resources corresponding to a guard band between two bandwidth parts and/or a guard band between a bandwidth part and a transmission bandwidth configuration edge and/or at one or more non-allocated time-frequency resources between a transmission bandwidth configuration edge and a channel bandwidth edge; and
  causing the performing of the one or more measurements at least by the first access node using non-allocated time-frequency resources comprising said one or more non-allocated time-frequency resources following the adjusting.

18. A non-transitory computer-readable medium storing a set of instructions for causing an apparatus to perform at least:
  receiving data via at least one antenna of a radio receiver or transceiver of a first access node;
  performing resource mapping on the received data based on scheduling information defining currently allocated uplink time-frequency resources to isolate at least a first data set corresponding to non-allocated uplink time-frequency resources;
  comparing the first data set against one or more first pre-defined criteria for detecting interference;
  in response to detecting interference in the first data set according to said one or more first pre-defined criteria, causing transmitting information on the detected interference to a core network;
  in response to the detecting of the interference in the first data set according to said one or more first pre-defined criteria, calculating one or more values of one or more first measurement metrics quantifying the detected interference based on the first data set, wherein the one or more first measurement metrics in the first data set comprise one or more metrics selected from a group comprising: a duration of the detected interference, power level of the detected interference, average power level of the detected interference, a bandwidth of the detected interference, occurrence frequency of the detected interference, a metric quantifying sweeping nature or continuous presence of energy higher than a pre-defined energy threshold in the detected interference; and
  in response to detecting interference in the first data set according to one or more second pre-defined criteria defined for the one or more values of the one or more first measurement metrics, verifying detection of the interference by
    adjusting at least one tunable digital filter of said radio receiver or transceiver for enabling reception and performing of one or more measurements at one or more non-allocated time-frequency resources corresponding to a guard band between two bandwidth parts and/or a guard band between a bandwidth part and a transmission bandwidth configuration edge and/or at one or more non-allocated time-frequency resources between a transmission bandwidth configuration edge and a channel bandwidth edge, and
    causing the performing of the one or more measurements at least by the first access node using non-allocated time-frequency resources comprising said one or more non-allocated time-frequency resources following the adjusting.

19. The apparatus of claim 2, wherein the at least one memory and the computer program code are configured, with the at least one processor, to cause the apparatus to perform:
  acquiring the scheduling information from a data link layer scheduling entity of the first access node.

20. The apparatus according to claim 2, wherein the at least one memory and the computer program code are configured, with the at least one processor, to cause the apparatus to perform in response to the detecting of the interference in the first data set according to said one or more first pre-defined criteria or in response receiving a second command from the core network following the transmitting:
  instructing a data link layer scheduler entity of the first access node to avoid scheduling uplink time-frequency resources affected by said interference based at least on the comparing.

* * * * *